United States Patent [19]

Kuehneman et al.

[11] Patent Number: 4,688,020
[45] Date of Patent: Aug. 18, 1987

[54] RECONFIGURABLE KEYBOARD

[75] Inventors: Gary Kuehneman, Plano; Joel Leavitt, Carrollton, both of Tex.

[73] Assignee: United States Data Corporation, Richardson, Tex.

[21] Appl. No.: 609,961

[22] Filed: May 14, 1984

[51] Int. Cl.[4] .................................................. G08C 9/00
[52] U.S. Cl. ........................... 340/365 VL; 340/365 R
[58] Field of Search ........ 340/365 R, 365 VL, 365 S; 400/62-75

[56] References Cited

U.S. PATENT DOCUMENTS

| 3,956,745 | 5/1976 | Ellis | 340/365 VL |
|---|---|---|---|
| 4,066,850 | 1/1978 | Heys | 340/365 VL |
| 4,078,257 | 3/1978 | Bagley | 340/365 VL |
| 4,092,527 | 5/1978 | Luecke | 340/365 VL |
| 4,119,839 | 10/1978 | Beckmann et al. | 340/365 VL |
| 4,359,222 | 11/1982 | Smith et al. | 340/365 VL |
| 4,398,086 | 8/1983 | Smith | 340/365 VL |
| 4,479,112 | 10/1984 | Hirsch | 340/365 VL |

OTHER PUBLICATIONS

*Intelligent Keyboard*, manufactured by Foster Engineering and Manufacturing, Inc., Oct. 15, 1984, p. 99.
*IDT-2000* Sealed Industrial Keyboard, Industrial Data Terminals Corp., specification sheet.
Intelligent Panel System, Allen-Bradley, Design News Jun. 6, 1983, p. 143.
Pana Touch Key-Mat, Panasonic bulletin Dec. 1981.

*Primary Examiner*—James L. Rowland
*Assistant Examiner*—Brian R. Tumm
*Attorney, Agent, or Firm*—Jerry W. Mills; Gregory M. Howison; Roger N. Chauza

[57] ABSTRACT

A reconfigurable keyboard (10) includes a base (12) and a keyboard surface (14). The keyboard surface (14) has a plurality of keys (48) disposed thereon. Each of the keys (48) is associated with a key switch (34). An overlay (50) covers the key switches (34) that are not connected to keys (48). In this manner, only select ones of the key switches (34) are accessible. A CPU (78) controls the operation of the keyboard (10) and has stored therein key tables which define the function of each of the accessible keys (48) on the keyboard panel (14). A display (16) is provided for displaying messages which are also stored.

35 Claims, 13 Drawing Figures

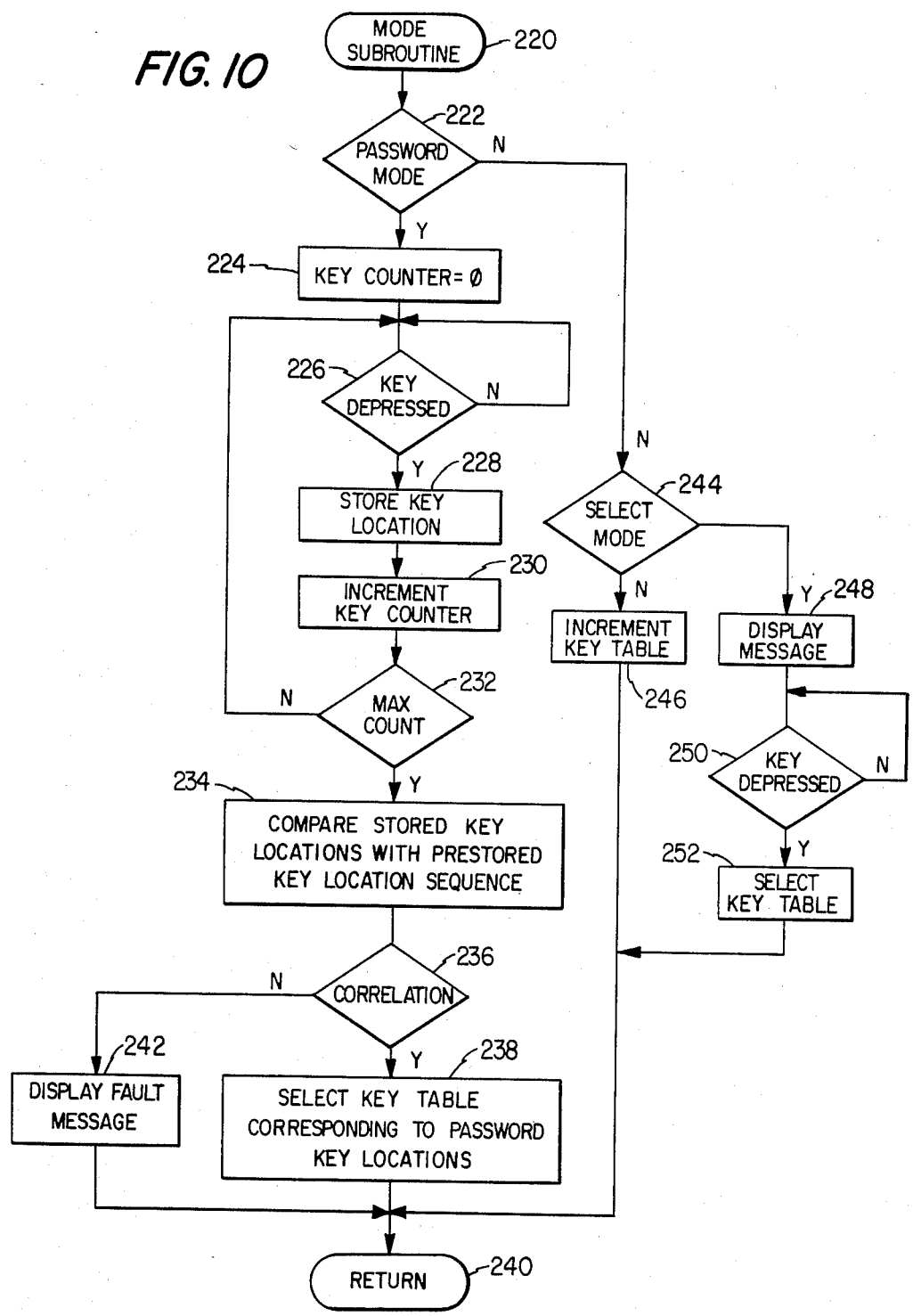

RECONFIGURABLE KEYBOARD

TECHNICAL FIELD OF THE INVENTION

The present invention pertains in general to keyboards for use with computers and the like and, more particularly, to a keyboard which has a reconfigurable matrix for selecting both the function and location of specific keys.

BACKGROUND OF THE INVENTION

Keyboards of various configurations are commonly used with various types of digital computers and other electronic devices. The configurations of such keyboards are generally governed by the specific application in which they are used. Depending upon the application, a keyboard may be as simple as a 10-key numerical keypad or as complex as a full function 117 key keyboard. Each of these configurations is oriented toward a particular class of users. For example, the numerical keypad may be utilized in calculator type applications oriented toward number manipulation, whereas the full function keyboard may be used to control a wide variety of desired functions. Alternatively, some applications require a keyboard with more keys than the minimum ten keys, but less than the full function keyboard.

However, due to the expense of customizing a keyboard, a user will often be required to utilize the full function keyboard in an application where only a smaller number of keys are required. For example, in some industrial applications, only a certain number of keys may be required to perform the necessary functions such as beginning operation, terminating operation and responding to prompt instructions. The number of keys required for such an industrial application may range anywhere from one to fifteen or more, depending upon the amount of control that an operator has over the system. With present systems, the operator must be provided a full function keyboard or a customized keyboard to perform these operations. If the full function keyboard is utilized, the operator is provided with unnecessary keys, which may cause confusion. Although such full function keyboards are relatively expensive, they are often less expensive than a customized keyboard with a unique orientation of keys.

Once a keyboard has been provided for a specific application, the location of the keys on the keyboard is usually predefined such that the operator is restricted to one area of the keyboard for a given function. For example, if an Arabic numeral is to be entered on a full function keyboard, a key will have to be selected from the top row of keys which is normally allocated for that function. This is the result of keyboard standardization which dictates the location of the keys for a given function. Each of the keys has a predefined output which is termed an ASCII character. A conventional computer or processing system recognizes the ASCII codes and performs the functions associated therewith. Most systems are geared towards recognizing a given ASCII code as associated with a given numeral, letter or other function. As a result of standardization, each of these given numerals, letters or functions is located at a predefined location.

To provide versatility for a given keyboard application, some computer manufacturers have developed software which recognizes a given key depression as a "function key". That is, the ASCII code associated with a given key causes the software of a given system to enter into a specified subroutine. The subroutine defines the function and is activated in response to the key depression and the corresponding output of the particular ASCII code. These function keys are provided to allow an operator to arbitrarily execute a desired special function with only a single depression of the key. Conventionally, these function keys are usually located at a predefined location on the keyboard, which location is not alterable. This is a disadvantage in that a user cannot define a particular key at a particular location to execute a given function, although the particular location would be advantageous for the situation.

The computer which interfaces with a keyboard possesses a command language to allow it to interface with the keyboard or any other peripheral device. The standard command language utilizes the ASCII characters which are stored in a table and correspond to particular functions. For example, depression of the key for the letter "A" outputs an ASCII character having a predetermined value. This value is looked up in the table and the appropriate function performed, such as displaying an "A". By reprogramming the computer, the ASCII character can correspond to a different function. However, this is undesirable as the look up table for the ASCII character or other command languages are seldom accessible, and, for closed code systems, are never available.

In view of the above disadvantages with standardized keyboards, there exists a need for a reconfigurable keyboard in which various functions can be associated with given keys at select key locations and these functions output to correspond to the command language of a given host device. In addition, it is desirable that the number of keys provided on a keyboard and the location thereof can be easily and inexpensively altered at the discretion of the user.

SUMMARY OF THE INVENTION

The present invention disclosed and claimed herein comprises a reconfigurable keyboard which includes a keyboard matrix of predefined locations. A switch mechanism is provided for allowing selection of each of the predefined key locations. The location of the selected one of the predefined locations is then determined relative to the other key locations. A plurality of key tables are stored in a memory device, each of the key tables containing a unique set of information to define the nature or function of each of the key locations. One of the key tables is selected to govern the keyboard and define the nature of each of the predetermined key locations such that selection of a key location corresponds to the set of unique information in the key table. A signal is then output from the keyboard as a function of both the selected key location and the nature of the that key location stored in the key table. By selecting another key table, the keyboard can be reconfigured.

In yet another embodiment of the present invention, the reconfigurable keyboard has a memory provided for storing a plurality of messages in a message table. Each of the messages in the message table is associated with key location information in a given key table Therefore, the message is defined by the nature of a select one of the key locations as defined in the governing one of the key tables. After selection of the message, it is displayed on a display proximate to the keyboard.

In yet another embodiment of the present invention, access to select ones of the key tables is inhibited until an access sequence is initiated. Upon initiation of the access sequence, a sequence of selected key locations selected by the keys is stored. As these keys are selected, a counter counts the number of keys. After a predetermined number of key selections are counted, the stored sequence is compared with a predetermined pattern or sequence and access is permitted when a valid comparison is made.

In a further embodiment of the present invention, a given key location has the access thereto inhibited. In order to access this given key, the key location is selected and followed by a selection of a sequence of key locations. After a predetermined number of key locations has been accessed, the selected sequence is compared with a predetermined pattern and, if a valid comparison is made, access is permitted to the key.

BRIEF DESCRIPTION OF THE DRAWINGS

For a more complete understanding of the present invention and the advantages thereof, reference is now made to the following description taken in conjunction with the accompanying Drawings in which:

FIG. 10 illustrates a flow chart for the mode subroutine.

DETAILED DESCRIPTION OF THE INVENTION

Figure 1:
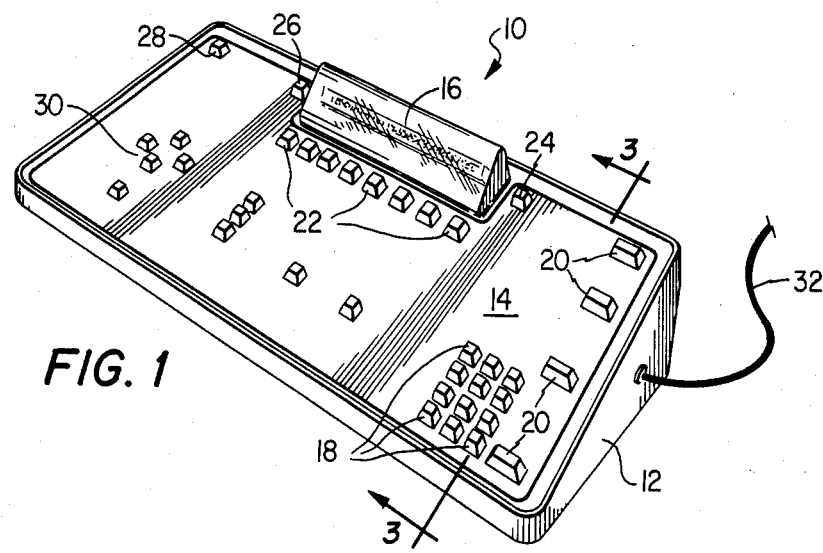
FIG. 1 illustrates a perspective view of the reconfigurable keyboard in accordance with present invention.

Referring now to FIG. 1, there is illustrated a perspective view of a reconfigurable keyboard 10 in accordance with the present invention. The reconfigurable keyboard 10 includes a base 12 for disposal on a work surface. The base 12 has a planar surface which is tilted upward at an angle to the work surface and has a key panel 14 disposed thereon. The key panel 14 has a plurality of keys disposed thereon in various groups. A display 16 is disposed on the upper planar surface of the base 12 and oriented to facilitate viewing by the key operator.

The keys on the key panel 14 are oriented in functional groups in the embodiment illustrated in FIG. 1. As will be described hereinbelow in more detail, the arrangement of the keys in the functional groups and the functions thereof are determined by the user. A functional group 18 is provided for alphanumeric manipulations and has keys provided for the Arabic numerals 0-9. A group of functional keys 20 is disposed on the periphery of the key panel 14, which keys are operable to input various standard functions. A group of display keys 22 are disposed beneath the display 16 to manipulate the display 16. A Clear key 24 is disposed on one side of the display 16 and a Print key 26 is disposed on the opposite side of the display 16. A Reset key 28 is disposed on one of the peripheral corners of the key panel 14 for resetting the system and a group of ON/OFF control keys are disposed on the opposite side of the key panel 14 from the alphanumeric keys 18. In addition to these functional groups, various other functional groups and/or keys are included on the key panel 14. As will be described hereinbelow, the configuration of the functional groups illustrated in FIG. 1 is only one of many configurations that can be incorporated into the reconfigurable keyboard 10 of the present invention. Although not illustrated, the reconfigurable keyboard 10 is connected to a host computer or other device through a cable 32. Once configured, the keyboard 10 is then operable to output information to the host computer for interaction therewith.

Figure 2:
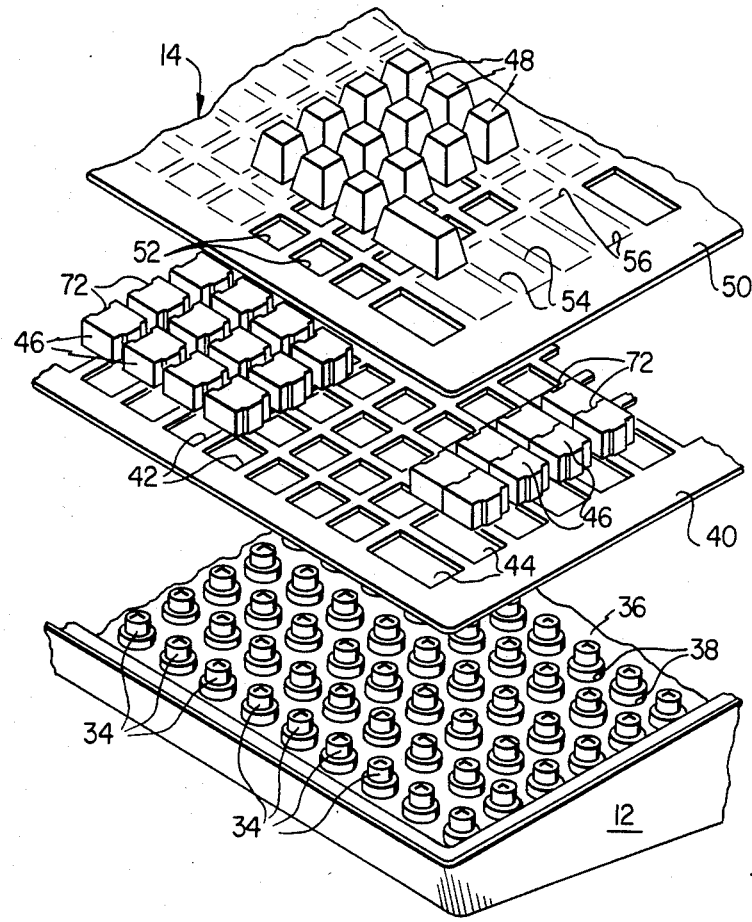
FIG. 2 illustrates an exploded view of one corner section of the reconfigurable keyboard.

Referring now to FIG. 2, there is illustrated an exploded view of the key panal 14 of FIG. 1 with only the portion containing the functional group 18 illustrated, wherein like numerals refer to like parts in the various FIGURES. A plurality of plunger-type key switches 34 are disposed on a switch membrane (not shown) on the base 12. The switches 34 are located by a locating grid 36. The grid 36 has a plurality of orifices 38 disposed therein which are arranged in a matrix configuration. As will be described hereinbelow, the switch membrane that underlies the switches 34 is comprised of a plurality of X-conductors and a plurality of Y-conductors. Each of the switches 34, when activated, connects one of the Y-conductors with one of the X-conductors such that a conductive path is completed. By scanning the X- and Y-conductors, the activated switch can be detected.

A key grid 40 is disposed over the locating grid 36 and suspended therefrom about the periphery of the base 12 such that the tops of each of the key switches 34 are proximate the surface thereof. The key grid 40 has a plurality of rectangular orifices disposed therein and centered directly above each of the orifices 38. The rectangular orifices are divided into single rectangular orifices 42 for allowing access to individual ones of the key switches 34 and a double width rectangular orifice 44 for allowing access to two of the key switches 34 at a time. The rectangular orifices 44, in the preferred embodiment, are located on one side of the key panel 14 and are operable to form the function group 20.

Each of the key switches 34 is either covered by a protective cap 46 or connected to a key 48 which allows an operator to activate the key switch 34. The protective cap 46 is dimensional to correspond to the rectangular orifices 42 and, when in place, the upper surface thereof is coplaner with the upper surface of the key grid 40.

An overlay panel 50 is disposed on the upper surface of the key grid 40 and adhesively secured thereto. The overlay panel 50 is fabricated from a polycarbonate material which is flexible. The surface of the overlay panel 50 has a plurality of cuts formed therein. Each of the cuts is disposed along the perimeter of each of the rectangular orifices 42 and 44 on the key grid 40. The cuts are disposed such that the portion covering the rectangular orifices 42 and 44 can be removed to allow one of the keys 48 to be disposed therethrough.

In the embodiment illustrated in FIG. 2, the keys 48 are insertable through orifices 52 in the overlay panel 50 which are formed by removing that portion of the overlay panel 50 covering the rectangular orifices 42 and 44.

For those of the key switches 34 covered by one of the caps 46, the adjacent portion of the overlay panel 50 remains in contact and is adhesively secured to the tops of caps 46.

In the fabrication of the overlay panel 50, each of the potential orifices 52 is defined by two parallel cuts 54 and two parallel cuts 56, the cuts 56 being perpendicular to the parallel cuts 54. The ends of the cuts 56 do not intersect with the ends of the cuts 54 such that a small tab is formed therebetween. The cuts 54 and 56 provide a boundary for one of the rectangular orifices 42 and 44. As will be described hereinbelow, the portion of the overlay panel 50 bounded by the cuts 54 and 56 can be selectively removed. Since the overlay panel 50 is adhesively secured to both the key grid 40 and the protective caps 46, removal of the bounded portion also results in removal of the protective caps 46 disposed directly thereunder. This will be described in more detail hereinbelow.

Figure 3:
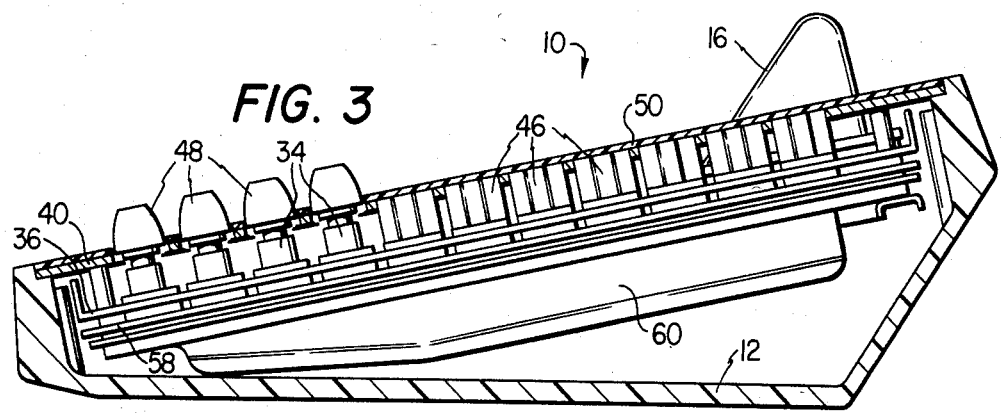
FIG. 3 illustrates a cross-sectional view taken along lines 3—3 of FIG. 1.

Referring now to FIG. 3, there is illustrated a cross-sectional view of the keyboard 10 taken along lines 3—3 in FIG. 1, wherein like numerals refer to like parts in the various FIGURES. Each of the key switches 34 is held at a specific location, as described above, by the location matrix 36. The bottom of the key switches 34 are in contact with a key switch membrane 58 which, as described above, is comprised of a plurality of X- and Y-conductors. The entire assembly is attached to a CPU housing 60 which houses the electronic circuitry that controls and reconfigures the keyboard 10, as will be described hereinbelow. When not utilized, the key switches 34 that are covered by the caps 46 are also covered by the overlay panel 50 such that both access to the key switch 34 is inhibited and the protected caps 46 are kept out of view.

Figure 4:
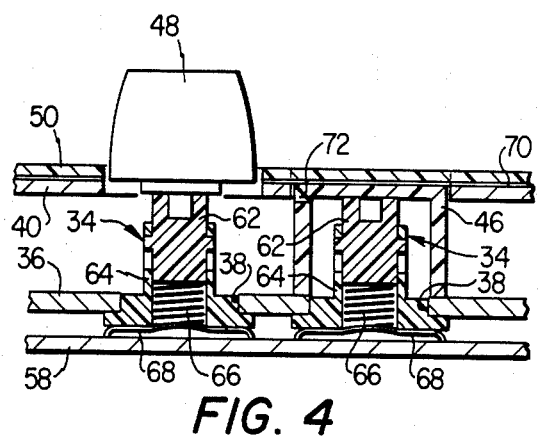
FIG. 4 illustrates a cross-sectional view of an accessed key adjacent a nonaccessed key.

Referring now to FIG. 4, there is illustrated a cross-sectional diagram of two key switches 34, one of which is interfaced with a key 48 and one of which is covered by one of the protective caps 46. Like numerals refer to like parts in the various FIGURES. Each of the key switches 34 is comprised of a plunger 62 which reciprocates within a cylindrical housing 64. The plunger 62 is supported upwards by a spring 66 which is disposed between the end of the plunger 62 and a spring type membrane 68. The spring membrane 68 contacts the switch membrane 58 upon depression of the plunger 62 to make contact between one of the X-conductors and one of the Y-conductors on the switch membrane 58.

Figure 5:
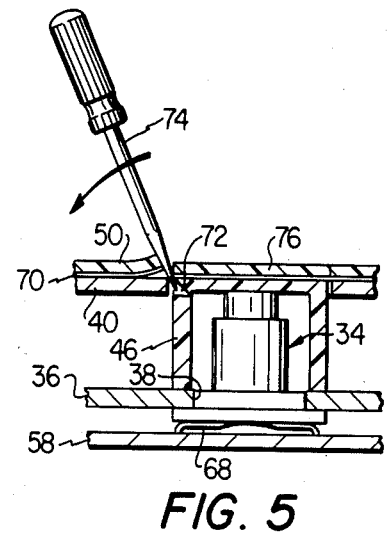
FIG. 5 illustrates the physical selection of a given key location.

Referring now to FIG. 5, there is illustrated a cross-sectional diagram of one of the protective caps 46 and the procedure of removal thereof. Each of the protective caps 46 has a recess 72 formed in one of the upper edges thereof. This recess 72 is functional to receive the end of a screwdriver 74 or similar device to allow prying thereof. To remove one of the key caps 46, a screwdriver 74 has the tip thereof inserted into the cut in the overlay panel 50 that is adjacent the side of the protective cap 46 on which the recess 72 is formed. The tip of the screwdriver 74 is placed into the recess 72 and the protective cap 46 pried up and removed. A portion 76 of the overlay panel 50 that is attached to the top of the protective cap 46 is also removed therewith. In this manner, the protective cap 46 can be replaced with the portion 76 of the overlay panel 50 intact.

In order to ensure that the recess 72 is properly oriented, some form of labeling is applied to the top thereof such that the orientation can be distinguished. In the preferred embodiment, the letter L is disposed on the left side of the protective cap 46 and the letter R is disposed on the right side thereof. In this manner, an operator is aware that the left side of the protective cap that is covered with the overlay panel 50 has a recess therein. Since the cuts in the surface of the overlay panel 50 are visible, an operator need only insert the tip of the screwdriver 74 through the left side of the portion 76 to facilitate removal thereof. The cap 46 can then be removed and stored until the keyboard 10 is reconfigured and different positions for the keys are determined.

Figure 6:
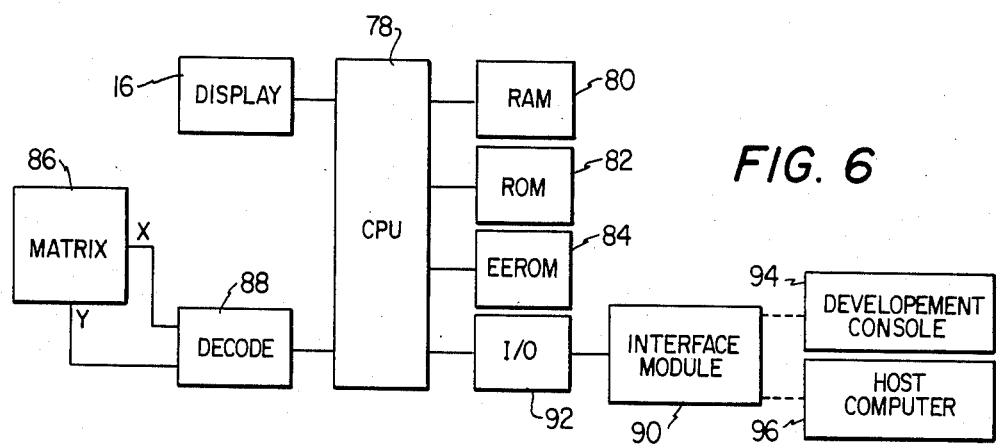
FIG. 6 illustrates a block diagram of the system in accordance with the present invention.

Referring now to FIG. 6, there is illustrated a block diagram of the control system of the present invention which is housed in the CPU housing 60. A central processing unit (CPU) 78 is interfaced with the display 16 for control thereof. A Random Access Memory (RAM) 80, a Read Only Memory (ROM) 82, and an Electrically Erasable Read Only Memory (EEROM) 84 are also interfaced with the CPU 78 to provide a memory base therefor. As described above, the switch membrane 58 is comprised of a plurality of X- and Y-conductors which form a matrix 86. The X-conductors of the matrix are interfaced with a decoder 88 and the Y-conductors thereof are also interfaced with the decoder 88. The decoder 88 is then interfaced between the matrix 86 and the CPU 78. The CPU 78 is interfaced with an interface module 90 through an Input/Output (I/O) circuit 92. The interface module 90 is operable to interface the CPU 78 between either a development console 94 or a host computer 96. The operation of the development console 94 will be described in more detail hereinbelow.

The host computer 96 possesses a command language that allows it to interface with the outside world. This command language recognizes commands such as ASCII characters, PAUSE and RESET. The keyboard 10 is operable to sense a key location, determine the associated function of the selected key locations and then output a command that is recognizable by the host computer 96. These commands may be as simple as the output of a single ASCII character or a more complex string of ASCII characters. For example, some computer systems are dedicated to word processing tasks and restrict the operator to a predefined library of functions. These systems are "closed code" systems and are not readily customized. Therefore, functions that require four or five key depressions to achieve a given character cannot be changed. By utilizing the reconfigurable keyboard 10 of the present invention, a single key at a desired location can be programmed to output the desired command or sequence of commands to perform the desired function. In this manner, a user can "customize" the keyboard 10 without having to alter the software in the host computer 96.

Figure 7A:
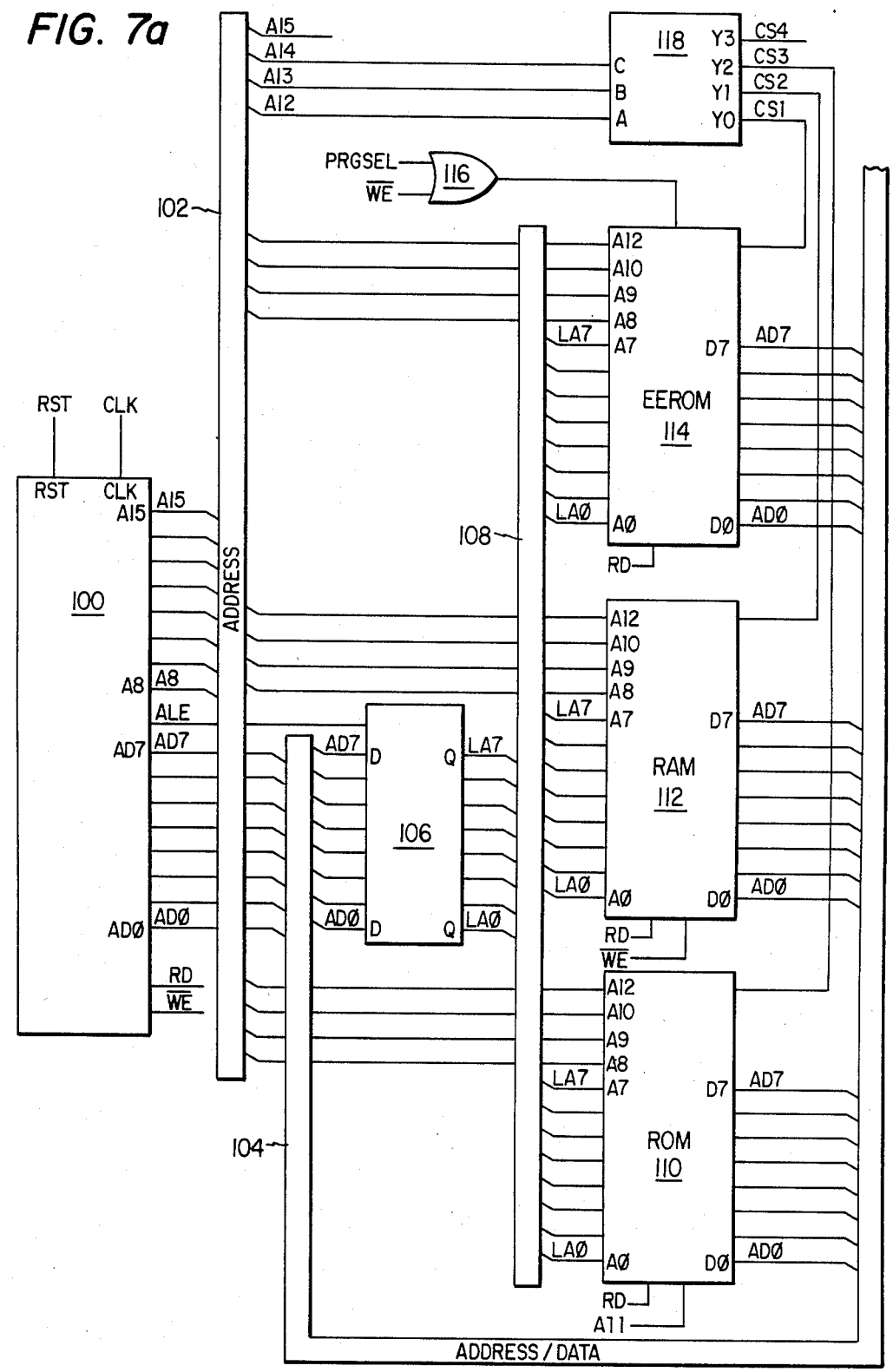
FIGS. 7a–7d illustrate a schematic of the CPU in accordance with the present invention.

Referring now to FIGS. 7a-7d, there are illustrated schematic diagrams of the system block diagram of FIG. 6. Referring particularly to FIG. 7a, a microprocessor 100 has the address outputs A8-A15 connected to an address bus 102 and the address/data outputs AD0-AD7 connected to an address/data bus 104. The microprocessor 100 is of the type 8085 manufactured by Intel Corp. The address/data bus 104 has the address lines AD0-AD7 connected to the D-inputs of an octal D-type latch 106. The Q outputs of the octal latch 106 are labeled LA0-LA7 and are connected to a latched address bus 108. The enable input of the octal latch 106 is connected to the ALE output of the microprocessor 100. The octal latch 106 is of the type 74LS373 manufactured by Texas Instruments, Inc.

The latched address lines LA0-LA7 on the latched address bus 108 are connected to the address inputs A0-A7 of a Read Only Memory (ROM) 110, the A0-A7 inputs of a Random Access Memory (RAM) 112 and the A0-A7 inputs of an Electronically Erasable Read Only Memory (EEROM) 114. The address inputs A8-A12 of the ROM 110 are connected to the address lines A8-A12 of the address bus 102, the address inputs A8, A9, A10 and A12 of the RAM 112 are connected to the corresponding address lines of the address bus 102 and the address inputs A8, A9, A10 and A12 of the EEROM 114 are connected to the corresponding address lines of the address bus 102. The ROM 110 is of the type 27128 manufactured by Intel Corp., the RAM 112 is of the type HM6116 manufactured by Hitachi and the EEROM 114 is of the type X2816 manufactured by Xicor. However, similar devices may be utilized in the present invention.

The READ input of the ROM 110 is connected to the $\overline{RD}$ output of the microprocessor for control thereof. To control the RAM 112, the read input thereof is connected to the $\overline{RD}$ output of the microprocessor 100 and the WRITE/ENABLE input of the RAM 112 is connected to the $\overline{WE}$ output of the microprocessor 100. The EEROM 114 has the READ input thereof connected to the RD signal from the microprocessor 100 and the WRITE input thereof connected to the output of an OR gate 116. One input of the OR gate 116 is connected to the right enable signal $\overline{WE}$ output by the microprocessor 100 and the other input thereof is connected to an external program select signal PRGSEL to allow the information to be written to the EEROM 114.

The data outputs D0-D7 from the ROM 110 are connected to the address lines AD0-AD7 of the address/data bus 104, the data output lines D0-D7 of the RAM 112 are connected to the data lines AD0-AD7 of the address/data bus 104 and the data outputs D0-D7 on the EEROM 114 are connected to the data lines AD0-AD7 of the address/data bus 104. A 3-to-8 decoder 118 has the A, B, and C inputs thereof connected to the address lines A12, A13 and A14 from the address bus 102 and the Y0 output thereof connected to the ENABLE input of the EEROM 114, the Y1 output thereof connected to the ENABLE input of the RAM 112 and the Y2 output thereof connected to the ENABLE input of the ROM 110. The decoder 118 is operable to provide chip select signals such that only one of the memory devices 110-114 is activated at any given time. Therefore, data can be written to or read from the RAM 112, read from the ROM 110 or read from the EEROM 114. To program the EEROM 114, data is input thereto from the development console 94, as will be described hereinbelow.

Figure 7B:
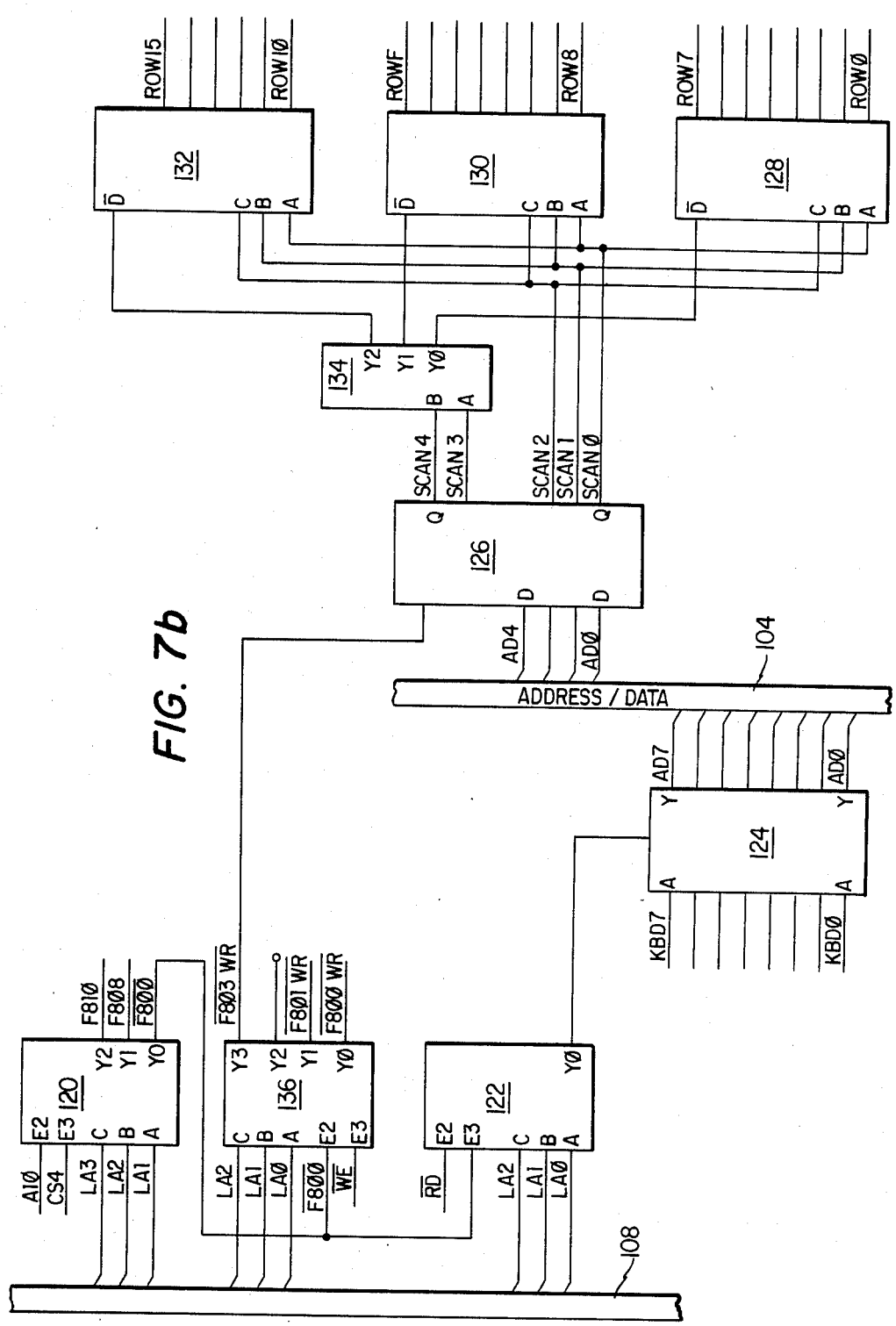

Referring now to FIG. 7b, there is illustrated a schematic diagram of the keyboard scanning circuit. A 3-to-8 decoder 120 has the A, B and C inputs thereof connected to the LA0, LA1 and LA2 data lines of the latched address bus 108, the ENABLE inputs thereof connected to the CS4 output from the decoder 118 in FIG. 7a and to the A10 address output of the address bus 102. The decoded outputs from the decoder 120 provide output signals for control of the various functions of the circuit, as will be described hereinbelow. A 3-to-8 decoder 122 has the A, B and C inputs connected to the LA0, LA1 and LA2 data lines from the latched address bus 108. One of the ENABLE inputs of the decoder 122 is connected to the $\overline{F800}$ signal output on the Y0 output of the decoder 120 and the remaining ENABLE input connected to the $\overline{RD}$ signal output from the microprocessor 100. The decoder 122 is the "Read" decoder that provides a signal indicating that the key data on the keyboard is to be read. An octal 3-state line driver 124 has the eight inputs thereof connected to corresponding ones of the output coordinates of the matrix 86. The output matrix signals are labeled KBD0-KBD7. The Y outputs of the line driver 124 are connected to the AD0-AD7 data lines of the address-/data bus 104. The line driver 124 is of the type 74LS244 manufactured by Texas Instruments, Inc.

An octel D-type flip flop 126 has the initial five D-inputs thereof connected to the AD0-AD4 data lines of the address/data bus 104. The Q outputs of the flip flop 126 provide scanning information and are labeled SCAN0-SCAN4. The SCAN0 output of the flip flop 126 is connected to the A inputs of BCD-to-decimal decoders 128, 130 and 132. The SCAN1 output signal is connected to the B inputs of the decoders 128-132 and the SCAN 2 signal is connected to C inputs of the decoders 128-132. The SCAN3 and SCAN4 output signals from the flip flop 126 are input to a 2-to-4 line decoder 134. The Y0 output of the decoder 134 is connected to the $\overline{D}$ input of the flip flop 188, the Y1 output of the decoder 134 is connected to the $\overline{D}$ input of the decoder 130 and the Y2 output of the decoder 134 is connected to the $\overline{D}$ input of the decoder 132. The decoders 128-132 are of the type 74LS145 and the decoder 134 is of the type 74LS139, all manufactured by Texas Instruments, Inc.

The outputs of the decoder 128 are labeled ROW-0-ROW7, the outputs of the decoder 130 are labeled ROW8-ROWF and the outputs of the decoder 132 are labeled ROW10-ROW15. Therefore, there are 22 outputs provided that are output to the other coordinate of the matrix 86. By scanning through each of the ROW outputs of the decoders 128-132 and monitoring the outputs from the other coordinates labeled KBD0-KBD7 with the line driver 124, the activated key can be determined.

In order to activate the scan cycle of the flip flop 126, a decoder 136 provides an output from the Y3 output thereof labeled $\overline{F803WR}$ to the ENABLE input thereof. The decoder 136 has one of the ENABLE inputs thereof connected to the Y0 output of the decoder 120 and the other ENABLE input thereof connected to the WRITE/ENABLE signal WE that is output from the microprocessor 100. The A, B and C inputs are connected to the latched address outputs LA0, LA1 and LA2 of the latched address bus 108.

Figure 7C:
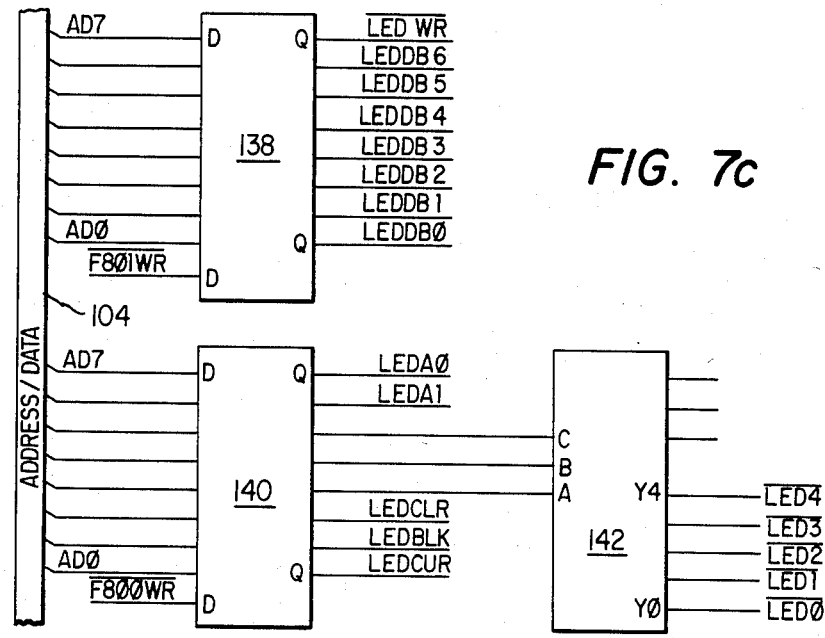

Referring now FIG. 7c, there is illustrated a schematic diagram of the display circuit for displaying a message on the display 16. An octal D-type flip flop 138 has the D-inputs thereof connected to the AD0-AD7 data lines of the address/data bus 104 and the ENABLE input thereof connected to the Y1 output of the decoder 136 that is labeled $\overline{F801WR}$ An octal D-type flip flop 140 has the D-inputs thereof connected to the AD-0-AD7 data lines of the address/data bus 104 and the ENABLE input thereof connected to the Y0 output of the decoder 136 that is labeled $\overline{F800WR}$. The Q outputs of the flip flop 138 corresponding to the AD0-AD6 data lines, comprise the data that is supplied to the LEDs on the display 16 and are labeled LEDD-B0-LEDDB6. The Q output corresponding to the AD7 input is labeled $\overline{LEDWR}$ and is the WRITE signal for the LED. The Q outputs of the flip flop 140 corresponding to the AD0-AD2 inputs are the LED CURSOR, BLANKING and CLEAR signals, respectively, and are labeled LEDCUR, LEDBLK, and LEDCLR. The Q outputs of the flip flop 140 corresponding to the AD6 and AD7 inputs are labeled LEDA1 and LEDA0 and provide binary numbers for picking the particular one of the segments, of which there are four. The Q outputs of the flip flop 140 corresponding to the AD3-AD5 inputs are input to the A, B and C inputs of a 3-to-8 decoder 142. The outputs Y0-Y4 are labeled $\overline{\text{LED}}$-0-$\overline{\text{LED4}}$ and correspond to the particular device selected of which there are five. Therefore, one of five devices can be selected with the decoder 142 and one of four segments in each device can be selected and then data input thereto through the flip flop 138.

Figure 7D:
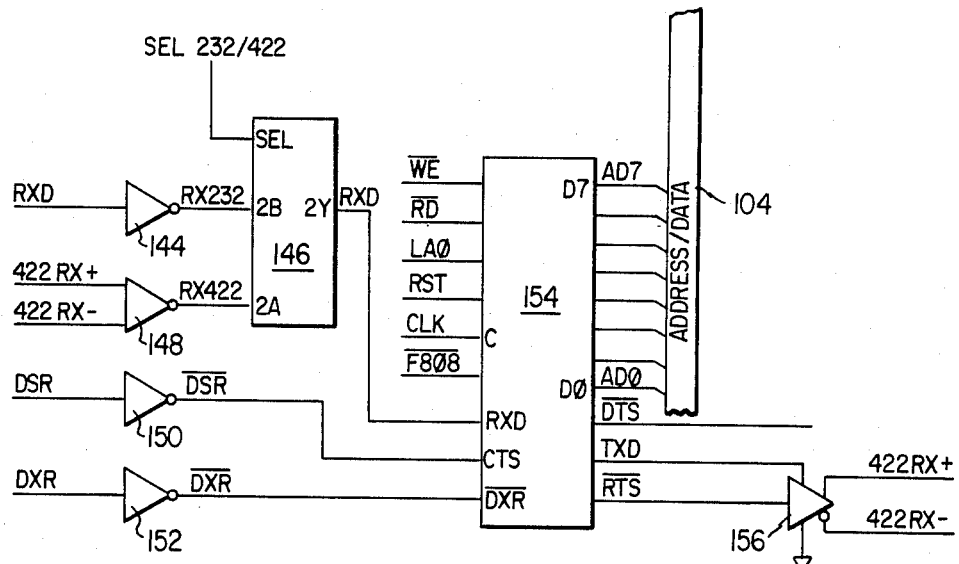

Referring now to FIG. 7d, there is illustrated a schematic diagram of the interface for inputting or transmitting data to an external source such as the host computer 96 or the development console 94. The data received for transmission on an RS232 bus is labeled RXD and is input to an inverter 144. The output of the inverter 144 is labeled RX 232 and is input to one input of a two line to one line data selector 146. The two inputs for RX422 operation are labeled 422RX+ and 422RX− and are input to two inputs of a receiver 148. The output of the receiver 148 is labeled RX422 and is input to the other input of the data selector 146. The output of the data selector 146 is labeled RXD. The SELECT input of the data selector 146 is connected to an SEL 232/422 signal which is input from an external source such as a switch. A DSR signal is input to an inverter 150, the output of which is labeled $\overline{\text{DSR}}$. A DXR signal is input to an inverter 152, the output of which is labeled $\overline{\text{DXR}}$. The RXD, $\overline{\text{DXR}}$ and $\overline{\text{CTS}}$ signals are input to the corresponding inputs of a Universal Asynchronous Receiver/Transmitter (UART) 154. The UART 154 is also connected to the $\overline{\text{WE}}$ signal, the $\overline{\text{RD}}$ signal, the RST signal and the CLK signal output by the microprocessor 100. In addition, the LA0 data line from the latched address bus 108 is connected to the UART 154. UART 154 is connected to the output of the decoder 120 on the Y1 output thereof labeled F808.

The data outputs D0-D7 of the UART 154 are connected to the address/data bus 104 for input and output of data therefrom. In order to receive information with the UART 154, the appropriate signals are supplied and the output of the data select 144 input thereto. On transmission, data is output on the $\overline{\text{DTR}}$, DTXD or the $\overline{\text{RTS}}$ outputs thereof. For RS422 operation, the TXD and $\overline{\text{RTS}}$ outputs are utilized and they are input to a 422 transmit circuit 156. The outputs of the transmit circuit 156 are labeled 422RX+ and 422RX−. The receiver 148 for the RX422 operation is of the type 226LS32 and the transmitter 156 is of the type 261S31. The UART 154 is of the type 8251. With the circuit of FIG. 7d, data can be effectively received or transmitted to an external source that is appropriately interfaced with either RS422 or RS232 interface boards.

The operation of the system will now be described in more detail. Each of the keys on the keyboard 10 has a predetermined location which can be coded by the decoder 88 for input to the CPU 78. In order to define the "nature" of each of the keys, a key table must be predefined by the operator and stored in a given location in system memory. For example, a given key may have a relatively straightforward nature such as an ASCII function wherein selection of that key results in the CPU looking up the nature of the key in a key table and then outputting an ASCII character in response to the data contained at the location in the key table corresponding to that key. Each key table has a dedicated memory location for association with each of the keys on the keyboard. If the key has no function, then the nature of the key is so defined at this memory location. Therefore, depression of a key with no defined nature results in no output or the display of a message indicating that this key is inactive. In the preferred embodiment, keys that do not have a defined nature are inaccessible by the operator.

A number of key tables can be provided depending upon the address capability of the CPU 78 and the amount of memory available. In the preferred embodiment, 255 key tables can be stored with selection of any of the key tables defining the specific nature of all of the key locations on the keyboard. Depending upon the application, the accessible number of keys can be varied in order to "customize" the keyboard.

In addition to the key tables being stored in memory, a message table is also stored therein. The message table is a portion of the memory in which up to 255 messages can be stored. However, additional message tables can be provided. For example, a message such as "Enter ID Number" can be stored in the message table in a specific location. This specific location is then associated with the nature of one of the key locations in a given key table. Depression of the key at this location causes the CPU 78 to look up the nature of the key location in the key table that "governs" the keyboard and then select a message from the message table in response to the "message nature" of the key and display it on the display 16. The operation of the message table will be described in more detail hereinbelow.

There are a number of different key "classifications" for the natures of the given key locations as defined by the governing key table. These are "predefined" keys, "special function" keys and "ASCII code" keys. The "predefined" keys are of the type that output standard functions such as CLEAR, ACKNOWLEDGE, and RESET. The "special function" keys pass operation of the system on to a subroutine, such as that required to retrieve a message from the message table and display it on the display 16. The ASCII key is the most general of key types and simply outputs an ASCII code in a similar manner to a standard keyboard.

Figure 8:
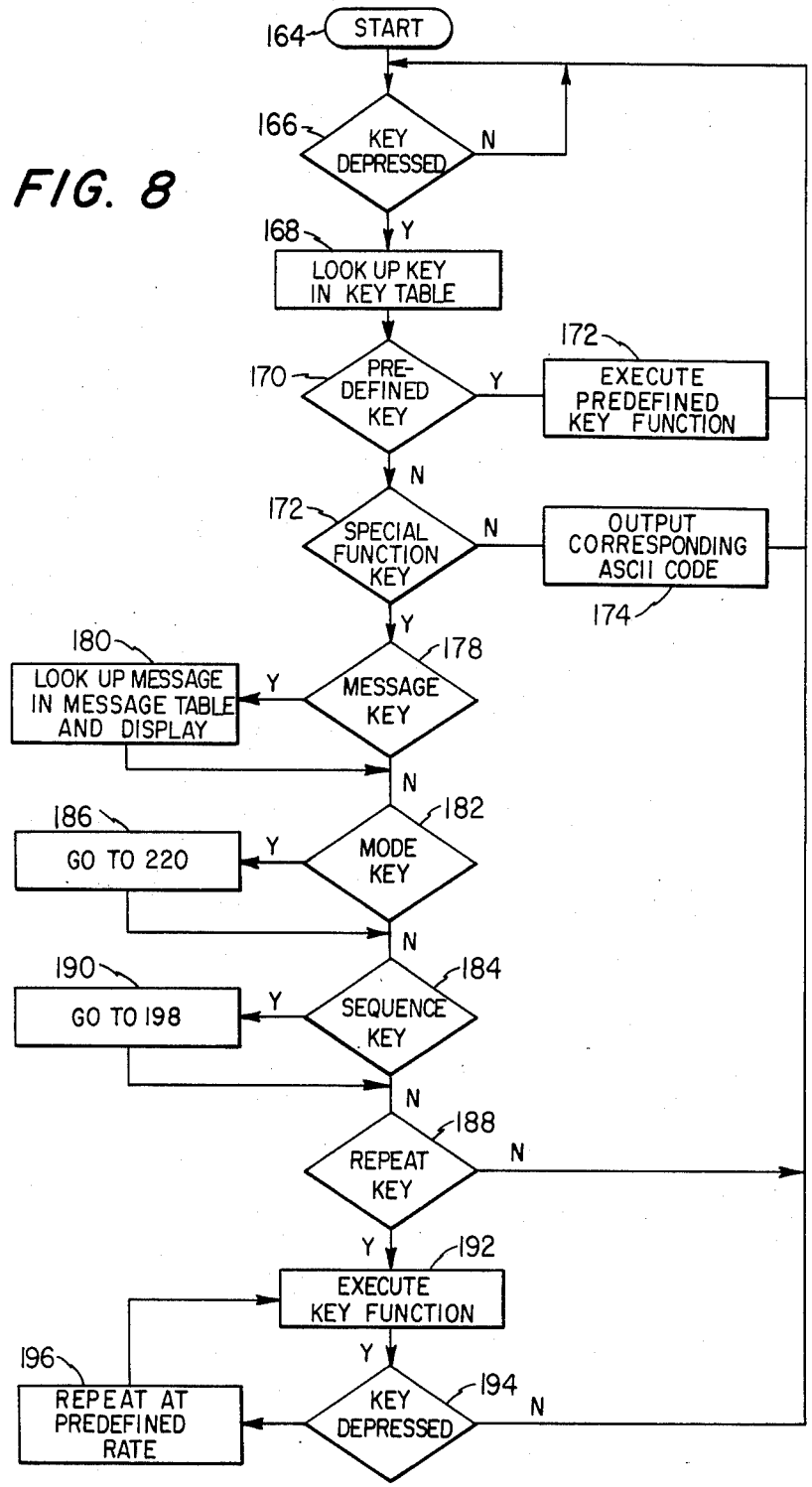
FIG. 8 illustrates a flow chart for the main program.

Referring now to FIG. 8, there is illustrated a flow chart for the operation of the main program for the keyboard 10 in accordance with the present invention. The flow chart is initiated at a START block 164 and then proceeds to a decision block 166. The decision block 166 determines whether a key is depressed. The program proceeds around the "N" path from the decision block 166 back to the input thereof until a key is depressed. During this time, the keyboard is continually scanned and no data is output until a key is depressed. Upon depression of a key, the program flows along the "Y" path from the decision block 166 to the input of a function block 168 to look up the key in the key table. This is the operation by which the key is decoded and the location thereof determined and then the stored nature of this key location, as defined by the governing one of the key tables, is fetched.

After fetching the nature of the key from the governing one of the key tables, the program proceeds to the input of a decision block 170 to determine whether the key is a "predefined" key. If the key is a "predefined"

key, the program flows along the "Y" path to a function block 172 to execute the "predefined" key function and an appropriate command is output to the host computer 96. The program then flows back to the input of the decision block 166 to again determine whether a key is depressed.

If the nature of the depressed key as defined in the key table is not that of a "predefined" key, the program flows from the decision block 170 along the "N" path thereof to the input of a decision block 172 to determine whether the depressed key is defined as a "special function" key. If it is not a "special function" key, the program flows along the "N" path to a function block 174 to output a corresponding ASCII code. As defined above, if the key is not a "predefined" key, or a "special function" key, then it must be an ASCII key. After outputting the corresponding ASCII code, the program flows from the function block 174 back to the input of the decision block 166 to scan the keyboard.

If the depressed key is defined in the key table as a "special function" key, the program flows from the decision block 172 along the "Y" path thereof to various decision blocks that represent subroutines for "special functions". These special functions are "Message", "Mode", "Sequence" and "Repeat". The operation of each of these keys will be defined with reference to the particular subroutine hereinbelow.

The flow chart flows from the decision block 172 along the "Y" path thereof to the input of a decision block 178 to determine if the depressed key is defined as a Message key. If the depressed key is a Message key, the program flows along the "Y" path from the decision block 178 to the input of a function block 180 to look up the message in the message table and display this message. If the depressed key is not a Message key, the program flows along the "N" path from the decision block 178 to the input of a decision block 182. The output of the function block 180 also flows to the input of the decision block 182. The decision block 182 determines whether the depressed key is a Mode key. If the depressed key is not a Mode key, the program proceeds along the "N" path to the input of a decision block 184 and, if the depressed key is defined as a Mode key, the program flows along the "Y" path thereof to the input of a function block 186. The function block 186 transfers the program to a subroutine illustrated in FIG. 10. After execution of the function defined by the subroutine, the program proceeds back to the input of the decision block 184.

The decision block 184 determines whether the depressed key is defined as a Sequence key. If the depressed key is not defined as a Sequence key, the program flows along the "N" path thereof to the input of a decision block 188 and, if the depressed key is defined as a Sequence key, the program flows along the "Y" path thereof to the input of a function block 190. The function block 190 transfers the program to a subroutine, as defined hereinbelow with reference to FIG. 9. The subroutine of FIG. 9 returns to the function block 190 and flows to the input of the decision block 188. The decision block 188 determines whether the depressed key is defined as a Repeat key.

If the key is not defined as a Repeat key, the program flows along the "N" path thereof back to the input of the decision block 166. If, however, the depressed key is defined as a Repeat key, the program flows along the "Y" path thereof to the input of a function block 192 to execute the key function. This key function may be an ASCII code. After execution of the key function in the function block 192, the program flows to the input of a decision block 194 to determine if the key is still depressed. If the key is still depressed, the program flows along the "Y" path thereof to a function block 196 to return to the function block 192 and repeat the function. The function block 196 delays the return to the execute key function such that the loop from the output of the function block 192 to the decision block 194 and the function block 196 has a defined rate of repetition. This rate is predefined by the user. If the key is not depressed at the decision block 194, the program flows along the "N" path thereof back to the input of the decision block 166 to scan for the next depressed key.

Figure 9:
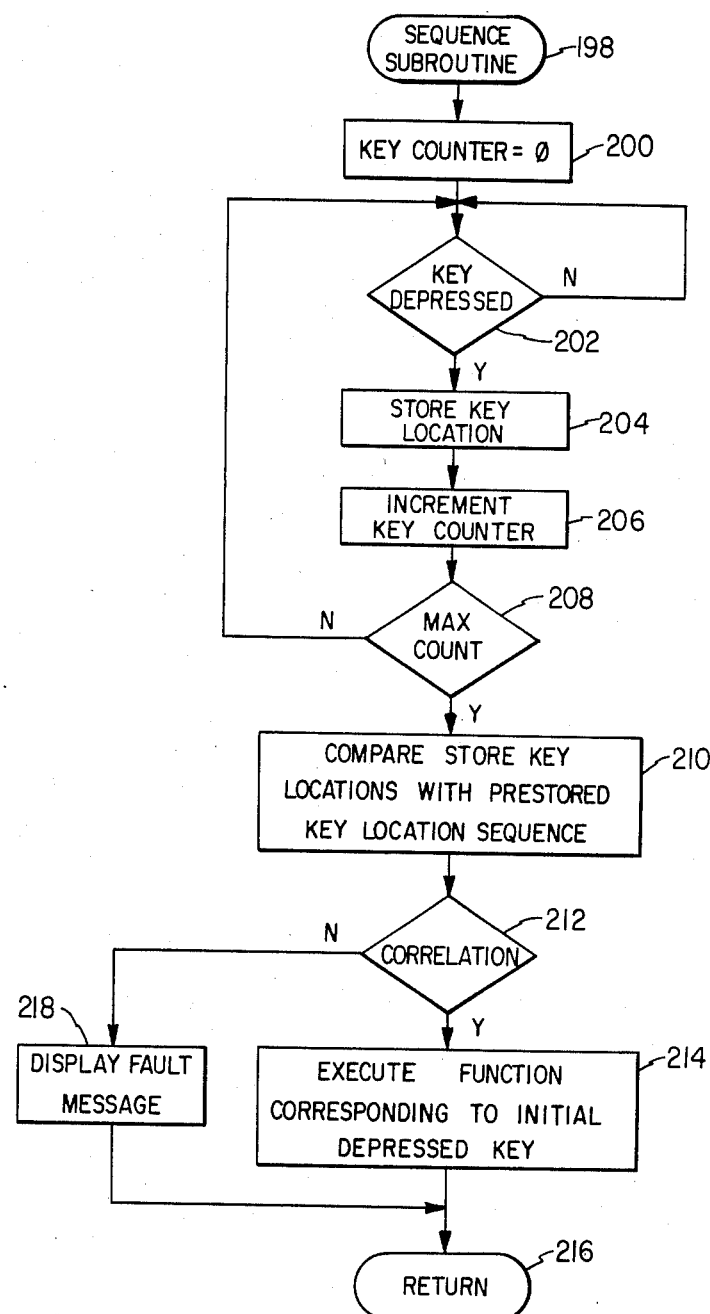
FIG. 9 illustrates a flow chart for the sequence subroutine.

Referring now to FIG. 9, there is illustrated a flow chart for the Sequence key subroutine defined by the function block 190. The Sequence subroutine is entered in a START block 198 and proceeds to a function block 200 to set a key counter equal to zero. The program then flows to the input of a decision block 202 to determine if a key is depressed. If a key is not depressed, the program returns back to the input thereof along the "N" path thereof and, if the key is depressed, the program flows to the input of a function block 204.

The function block 204 stores the key location of the depressed key and then the program flows to a function block 206 to increment the key counter. The program then flows to a decision block 208 to determine whether the key counter is at maximum count. This maximum count is a predefined number. If the predefined number of key counts is not present, the program returns along the "N" path thereof to the input of the decision block 202 to await the next depressed key.

When the maximum count is achieved, the program flows from the decision block 208 to the input of the function block 210. The function block 210 compares the stored key locations with a prestored key location sequence. The number of key locations in the prestored key location sequence does not necessarily equal the total number of keys depressed. For example, a prestored key location may require four adjacent keys in a given row to be sequentially depressed from left to right. However, the maximum count may be as many as 10 keys. In this manner, a larger degree of difficulty would be encountered in trying to guess the key sequence since the possible combinations for a 10 key sequence are much larger than that for a four key sequence. This will be described further hereinbelow.

The program then flows to a decision block 212 to determine if the stored key locations correlate with the prestored sequence. If so, the program flows along the "Y" path thereof to a function block 214 to execute the function corresponding to the depressed key sequence and output a corresponding command to the host computer 96. This function can be as simple as outputting an ASCII code or a sequence of ASCII codes. After executing the function, the program flows to a return block 216 to return to the main program. If there is no correlation, the program flows along the "N" path from the decision block 212 to the input of a function block 218. The function block 218 displays a fault message and then flows to the input of the return block 216. The fault message may be such as "Improper Sequence Input - Try Again".

In operation, the sequence subroutine is operable to protect the operation of a given key. For example, a given key may be designated as an "Execute" key. However, the nature of the key defined in the key table defines this key as a sequence key. By so doing, an operator is required to depress the Execute key and then depress, for example, four keys in a predetermined sequence thereafter to perform an Execute function. This Execute function will not be performed until the proper sequence is entered after depression of a key.

Referring now to FIG. 10, there is illustrated a flow chart for the Mode subroutine of function block 186. The Mode subroutine is initiated at a start block 220 and flows to a decision block 222. The decision block 222 determines whether the mode defined by the Mode key is a password mode or a key table select mode. The password mode, as will be defined hereinbelow, is a mode in which the key table is reconfigured after an appropriate password is input. The key table select mode is a mode wherein the operator can select a given key table to reconfigure the keyboard.

If the password mode is selected, the program flows from the decision block 222 along the "Y" path thereof to the input of function block 224 to set the key counter equal to zero. The program then flows to the input of a decision block 226 to determine if the key is depressed. Until a key is depressed, the program flows along the "N" path thereof back to the input. When a key is depressed, the program flows along the "Y" path to a function block 228 to store the key location and then to a function block 230 to increment a key counter. The program then flows to a decision block 232 to determine if the key counter is equal to the maximum count, a prestored number. If the key counter is not equal to the maximum count, the program proceeds back to the input of the decision block 226 to await another depressed key.

When the maximum count has been achieved, the program flows along the "Y" path from the decision block 232 to a function block 234 to compare the stored key locations and the input sequence thereof with a prestored key location sequence. This is very similar to the sequence routine. The program then proceeds to a decision block 236 to determine if the stored key locations and the sequence with which they were stored correlate with the prestored key location sequence. If so, the program flows along the "Y" path to a function block 238 and a key table is selected corresponding to the password key locations input thereto. The keyboard is then reconfigured according to the selected key table. The program then flows to a return block 240 and returns to the main program. If there is no correlation, the program proceeds from the decision block 236 along the "N" path thereof to a function block 242 to display a fault message and then to the return block 240. Although not illustrated, the password or the stored key locations can be compared with more than one prestored key location sequence. Depending upon which of the prestored key location sequences that the input key sequence correlates with, a different key table can be selected. In this manner, more than one protected key table can be provided.

In the key table select mode, the program flows from the decision block 222 along the "N" path thereof to the input of a decision block 244 to determine whether the select mode is activated. If the select mode is not activated, the program proceeds along the "N" path to a function block 246 to increment the key tables and then to the return block 240. In this manner, the sequential key tables can be utilized and stepped through. In addition, a message can be displayed to indicate which key table is governing the keyboard. If this is not the desired key table, the next table can be selected. If the select mode is activated, the program proceeds from the decision block 244 along the "Y" path thereof to a function block 248 to display a message. The message is a prompt message which tells the operator to enter the desired key table. The program then flows to a decision block 250 to determine whether or not the key is depressed. Until the key is depressed, the program flows along the "N" path thereof back to the input and, when the key is depressed, the key flows along the "Y" path thereof to the input of a function block 252 to select the desired key table. The program then flows to the return block 240.

In operation of the password mode, any given configuration of the key table can be protected. For example, the desired application of the keyboard as defined by the accessible keys can be inhibited with the exception of an alphanumeric key pad section having digits from 0 to 9 in addition to a mode key labeled "Password". Therefore, the governing key table has all of the remaining accessible key locations nullified such that they are either inactive or defined as Message keys to display a message indicating their status. Upon depression of the Password key, a message will be displayed such as "Enter Password". The user then enters a predetermined number of digits and, if it corresponds with the prestored password, a key table is selected and the keyboard configured to allow access to all of the keys for normal operation. In this manner, the keyboard is protected.

In an alternate method of protection for the keyboard, there can be a number of levels of access depending upon the status of the password. For example, the keyboard can be defined with three Password keys disposed thereon and a number of other accessible key locations. The first Password key is defined by the governing key table as a Password Mode key and the alphanumeric keys on an alphanumeric pad are defined as such in the governing key table. The remaining two Password keys are inactivated and will display some form of message to indicate to the user that they are inactive. Upon entry of the correct password after depression of the first Password key, the keyboard is reconfigured to define the second Password key as a Password Mode key and still retain the remainder of the keyboard inactive. A second user or the same user then depresses the second Password key and inputs a second password. Upon correlation of this second password with a second prestored key location sequence, the keyboard is again configured to define the third Password key as a Password Mode key with the remainder access key locations still inactive. A third individual or the same individual then depresses the third Password Mode key and inputs a third password. Upon correlation of this third password with a third prestored key location sequence, the keyboard is then activated to allow normal operation with all of the accessible key.

In order to program in the key tables, message tables and the sequences for both the password mode and the sequence mode, it is necessary to connect the interface module 90 to the development console 94. The development console 94 can be a Televideo model number 910 unit which allows a programmer to interact with the keyboard 10 to provide storage of key tables, mode sequences and messages. In the present embodiment, the interface module 90 has a mechanical switch or jumper (not shown) which is utilized to put the keyboard 10 in either the programming mode or the operating mode.

However, this change of modes can be accomplished with software. Upon entering the program mode, general rules and instructions, which are stored in the memory of the keyboard 10, are displayed on the development console 94. The programming is basically a series of prompts supplied to the programmer to first define the static keys and then the codes and then to define the tables.

The state keys are the "predefined" keys which, once defined, are not subject to change by the key tables. These keys are the ACKNOWLEDGE key, the CLEAR key, the RECALL key, and the DIAGNOSTIC key. For example, a programmer can define key number 100 as the CLEAR key and, thereafter, the key 100 will always be the CLEAR key regardless of which key table governs the operation of the keyboard.

The code keys are the RESET key, PAUSE key and MESSAGE key, all of which are defined by a user definable code. This user definable code is a code that is above the ASCII range and is essentially a code which is always associated with the particular function. For example, if the reset code is defined by the user as the output number 150, the occurrence of this code will always output a reset function to the host computer 96 during operation of the keyboard 10. By defining the reset function as a code rather than a key location, the code can be imbedded in output messages, sequences, etc. For example, the user can imbed the reset code into a given message such as "HELP", which message is provided to the host computer by the keyboard 10. This message is generated when help is required from the host computer 96. The reset directly follows this message and, upon recognition of the imbedded reset code by the keyboard 10, a system reset is generated. In addition to imbedding the code, it can also be associated with a particular one of the key locations, that is, the code output by the selected key location is the code 150 which corresponds to the output of a reset function.

The pause code is a code that outputs a system pause and the message code is a code that selects a message from the message table for display on the display 16. For example, if the word "HELP" were transmitted to the host computer 96 during operation thereof and this word were followed by a particular message code, the message corresponding to this message code would be selected from the message table and displayed on the display 16. This message could be a message such as "Help Requested".

After the static keys and codes are defined, the system prompts the programmer to define the message table. Initially, a format is displayed that explains to the operator how the message table works. The operator is then prompted as to whether he wishes to enter a message. This is normally done with the entry of a "Y" or an "N" for yes or no, respectively. If the user enters a "Y", a prompt is displayed for the first message which is given a number "0". The programmer then types a message of up to 80 characters into the display and then presses "Enter". This message is then stored in the message table. The system then prompts for messages 1 through 255 until a null response is received from the operator. When the operator is through entering messages, a message table is generated and stored in memory. Thereafter, when the message table is accessed, it is only necessary to follow the message access code with the particular message from 0 to 255 to display the appropriate message on the display 16.

After the message table has been input, the system then prompts the programmer to input a mode table. Initially, a format is displayed explaining the operation of the mode table and then a prompt is supplied for a mode ID. The mode ID is a function of a key sequence followed by the selected one of the key tables. The system will continue to prompt the operator until the operator is through entering associated key sequences and key table numbers.

After the mode table has been entered, the system then prompts the programmer to enter the various key tables. In the present embodiment, up to 256 key tables can be generated to define all of the key locations on the keyboard. Initially, a format is displayed to the programmer explaining how the key table works and then a prompt is supplied for the particular key table being defined. The system then prompts the programmer to enter a key number and then to define the nature of this particular key. In entering a key number, there are a number of methods that can be utilized. One method is to actually put in a number from 0 to 155, thereby defining the key location. Another method is to physically depress the desired key such that the system automatically "learns" the key location.

After the desired key has been selected, the nature of the key is defined. This nature is, as described above, either a special function or a standard function such as an ASCII output. Initially, the system prompts for a special function by displaying:

Enter Special Functions (L,M,R,S)

L=LED message generated when key pressed
M=Mode Key to start mode table sequence
R=Repeat function
S=Key sequence Upon depression of the L key, prompts are provided for the message number followed by entry of the message. Upon depression of the M key, the mode ID is entered. Upon depression of the R key, the repeat rate is entered in 1/100 sec. increments and upon depression of the S key, the key sequence combinations are entered.

If the selected key is not to be one of the special functions, the output for ASCII operation is input to define the nature of the key as an ASCII key. In addition to allowing a given key or key location to output a single ASCII character, the key can also be defined to output a series of ASCII characters with a code attached thereto. For example, the ASCII characters for the word "HELP" can be programmed into the nature of the key and associated with a code for the reset function or the code for the display of a message on the display 16. After either the key is defined as a special function key or a standard function, the system prompts for an additional key. If the table is complete, the program terminates and the programming of the keyboard 10 is complete.

In summary, there has been provided a reconfigurable keyboard which includes a key panel having a plurality of key switches contained therein. Each of the key switches is selectively accessible such that all of the keys do not have to be available for an operator. Each of the keys on the keyboard is defined as a location and an associated nature for each location. The nature of each of these locations is defined in key tables. Each key table that is stored in a memory is operable to define the nature of all of the accessible keys on the keyboard. This nature corresponds to a command that is output from the keyboard to a host device in response to selection of the key. In addition to key tables, there is also stored in the keyboard a message table. Each of the messages in the message table can be associated with the defined nature of the key in the key table such that depression of the key and subsequent look up in the key table results in display of the message on a display.

Although the preferred embodiment has been described in detail, it should be understood that various changes, substitutions, and alterations can be made therein without departing from the spirit and scope of the invention as defined by the appended claims.

What is claimed is:

1. A reconfigurable keyboard for interface with a host device, comprising:
    a keyboard matrix of predefined locations;
    means for defining the function of each of said predefined locations according to a matrix table;
    key selection means for allowing an operator to select at least one of said predefined locations and the function associated therewith;
    means for allowing the operator to physically select ones of said predefined locations and for inhibiting a function associated therewith from being carried out;
    means for altering said matrix table to redefine the function of each of said predefined locations;
    means for outputting command signals to the host device as a function of key selection and the function associated therewith as defined in said matrix table; and
    means for inhibiting access to ones of said predefined locations by said selection means, said inhibit means comprising a panel with an area having a perimeter perforation overlying each said predefined location, said area being adapted for removal to thereby allow access to desired ones of said predefined locations.

2. The reconfigurable keyboard of claim 1 further including a first table defining the function of said predefined locations, and wherein said means for altering is activated in response to the selection of one of said predefined locations by said selection means as defined by said first table.

3. The reconfigurable keyboard of claim 1 and further comprising a plurality of matrix tables, each table of said plurality of matrix tables having a unique set of values that defines the function of said predefined locations, said means for altering being operable to access select ones of said matrix tables.

4. A reconfigurable keyboard for interfacing with a host device, comprising:
    a grid of a plurality of predefined key locations;
    key means having a plurality of modifiable locations associated with said key locations such that when modified, selected said predefined key locations are accessible;
    location means for determining the relative location of each of said key locations such that a selected one of said key locations can be distinguished from the remaining key locations;
    means for storing a plurality of key tables, each of said key tables containing a unique set of information to define the function of each of said key locations;
    means for selecting one of said key tables to define the function of each of said predefined key locations;
    output means for outputting command signals to the host device corresponding to the function of the selected one of said key locations as defined in the selected one of said key tables, said command signals being compatible with the host device; and
    means for inhibiting access to select ones of said predefined key locations by covering said select ones of said predefined key locations by panel with an area having a perimeter perforation overlying each said select key location, said area being adapted for removal to thereby allow access to desired ones of said select key locations.

5. A reconfigurable keyboard for interfacing with a host device, comprising:
    a grid of a plurality of predefined key locations;
    key means having a plurality of modifiable locations associated with said key locations such that when modified, selected said predefined key locations are accessible;
    location means for determining the relative location of each of said key locations such that a selected one of said key locations can be distinguished from the remaining key locations;
    means for storing a plurality of key tables, each of said key tables containing a unique set of information to define the function of each of said key locations;
    means for selecting one of said key tables to define the function of each of said predefined key locations;
    output means for outputting command signals to the host device corresponding to the function of the selected one of said key locations as defined in the selected one of said key tables, said command signals being compatible with the host device; and
    means for allowing selection of ones of said key tables according to a standard procedure;
    inhibit means for inhibiting access to others of said key tables according to said standard procedure;
    means for initiating a nonstandard access sequence;
    means for storing a sequence of selected key locations selected by said key means after said nonstandard access sequence is initiated;
    counting means for counting the number of key locations selected in said nonstandard sequence;
    means for comparing said stored nonstandard sequence with a predetermined pattern after a predetermined number of counts; and
    means for overriding said inhibit means when a valid comparison is made.

6. The reconfigurable keyboard of claim 5 and further comprising:
    a single display on said keyboard for displaying textual messages;
    means for storing a plurality of messages and
    means for displaying said plurality of messages on said display in response to the respective selections of said predefined locations, said messages associated with the function of the selected key locations as defined by the governing one of said key tables.

7. The reconfigurable keyboard of claim 5 and further comprising:
    a message table;
    means for storing a plurality of textual messages in said message table;
    means for associating select ones of said messages with key location information in said message table such that the function of a select one of said key locations, as defined in the governing one of said key tables, corresponds to a select message in said key table; and means for displaying the selected one of said messages.

8. The reconfigurable keyboard of Claim 5 wherein said grid consists of a matrix that is comprised of a plurality of x-conductors and a plurality of y-conductors, each of said key locations defined by a bridging point between one of said x-conductors and one of said y-conductors.

9. The reconfigurable keyboard of Claim 8 wherein said location means comprises a decoder for outputting a signal representative of the select one of said key locations as defined by the connected one of said x-conductors and y-conductors.

10. The reconfigurable keyboard of Claim 5 wherein said selecting means selects a different key table in response to selection of one of said key locations by said key means.

11. The reconfigurable keyboard of claim 5 wherein said selecting means includes security means operative to select a different key table in response to selection of a predetermined sequence of said key locations, which sequence is not generally known.

12. The reconfigurable keyboard of claim 5 wherein said selecting means comprises a central processing unit.

13. A reconfigurable keyboard for interfacing with a host device, comprising:
a grid of a plurality of predefined key locations;
key means having a plurality of modifiable locations associated with said key locations such that when modified, selected said predefined key locations are accessible;
location means for determining the relative location of each of said key locations such that a selected one of said key locations can be distinguished from the remaining key locations;
means for storing a plurality of key tables, each of said key tables containing a unique set of information to define the function of each of said key locations;
means for selecting one of said key tables to define the function of each of said predefined key locations;
output means for outputting command signals to the host device corresponding to the function of the selected one of said key locations as defined in the selected one of said key tables, said command signals being compatible with the host device;
key inhibit means for inhibiting said output means when a select one of said key locations associated with the governing one of said key tables is selected such that the functions of the selected one of said key locations is defined by said governing key table is not output; and
means for overriding said ihibit means in response to the selection of a sequence of key locations by said key means after selection of the inhibited one of said key locations.

14. The reconfigurable keyboard of claim 13 and further comprising:
means for storing said sequence of selected key locations after said inhibited key location is selected;
counting means for counting the number of key locations selected in said sequence;
means for comparing said stored sequence with the predetermined pattern after a predetermined number of counts; and
means for overriding said inhibit means when a valid comparison is made;
the number of key locations in said sequence required to provide a valid comparison with said predetermined pattern less than the number of key locations required to provide said predetermined number of counts such that said sequence cannot be arrived at iteratively.

15. A reconfigurable keyboard, comprising:
a plurality of switches arranged in a matrix configuration;
an overlay panel disposed over said plurality of switches, said overlay panel having punch-out apertures therein for allowing access to a first group of said switches, said first group comprised of select ones of said switches at predefined locations in said matrix;
a plurality of protective caps covering said switches not within said first group for preventing the operation of the covered switches; and
key means for being connected to said first group of switches and extending through said apertures in said overlay panel in order to allow an operator access to said access switches.

16. The keyboard of claim 15 wherein said overlay panel comprises:
an access grid for disposal over said switches, said access grid having a plurality of orifices disposed therein corresponding to each of said switches, said orifices dimensioned to receive said protective caps, said protective caps being coplanar with the upper surface of said access grid when said protective caps cover nonaccessed ones of said switches; and
a layer of polycarbonate material disposed over said access grid and said protective caps, the portion of said polycarbonate layer proximate said orifices and said access grid removable to allow access to said protective caps covering the nonaccessed ones of said switches.

17. The keyboard apparatus of claim 16 wherein said polycarbonate layer is adhesively attached to said access grid and said protective caps such that removal of said protective cap results in removal of the portion covering the surface thereof and placement of said protective cap over one of said switches that is to be protected results in the removal of the portion of said polycarbonate layer being replaced to form a contiguous surface.

18. The keyboard apparatus of Claim 16 wherein the removable portion of said polycarbonate layer is defined by border cuts that traverse the perimeter of the ones of said orifices immediately below said removable portion, said border cuts not extending entirely around the perimeter such that a tab is formed that can be broken in order to remove said portion.

19. A reconfigurable keyboard for interfacing with the command language of a host computer, comprising:
a switch matrix having a plurality of switch contacts, each of said switch contacts having an activated state and a deactivated state and disposed at predetermined locations in said matrix;
a planar reconfigurable access panel for allowing access to select ones of said switch contacts and inhibiting access to unselected ones of said switch contacts;
key means associated with each of said accessed switch contacts for activation thereof;
decoding means for determining the matrix location of the activated ones of said switch contacts;

storage means for storing a plurality of matrix tables, each of said matrix tables having contained therein information as to the function of each accessible one of said switch contacts in association with the matrix location thereof such that selection of a specific one of said switch contacts results in the selection of the associated function;

means for selecting one of said matrix tables to define the associated functions of said switch contacts as a function of the matrix location thereof, said selecting means allowing for reconfiguation of the keyboard such that different matrix tables can be associated with said switch contacts to define the functions thereof;

said access panel being reconfigurable in conjunction with the selection of one of said matrix tables without removal of said access panel to allow access to select others of said switch contacts; and interface means for interfacing the keyboard with the host computer by outputting command signals corresponding to the command language of the host computer in response to activation of a select one of said matrix locations.

20. The reconfigurable keyboard of claim 19 wherein said switch matrix comprises a plurality of first parallel spaced apart conductors on one axis of a coordinate system and a plurality of second parallel spaced apart conductors on the second axis of the coordinate system, said switch contacts bridging between one of said first and one of said second conductors upon activation thereof.

21. The reconfigurable keyboard of claim 20 wherein:
said switch contacts each comprise a plunger operated switch membrane and movable by said key means, each of said membranes bridging between one of said first and one of said second conductors when said plunger is depressed by said key means; and said access panel comprises:
a grid for disposal over said switch membrane proximate an upper end of said plungers, said grid having a plurality of orifices disposed therein, each orifice associated with the plunger for each of said switch membranes to allow said key means to depress said plunger, and
an overlay for disposal over the entire surface of said grid and having a plurality of removable tabs associated with each of the orifices in said grid, each of said tabs selectively removable to access the plunger of the associated one of said switch membranes.

22. The reconfigurable keyboard of claim 21 wherein said key means comprises a key tab dimensioned to fit through an opening formed in said overlay when said removable portion is removed, and said key tab being insertable through the orifice in said grid.

23. The reconfigurable keyboard of claim 19 and further comprising:
a message table;
means for storing a plurality of textual messages in said message table;
means for associating select ones of said messages with functions stored in the selected one of said matrix tables such that the function of a select one of said switch contacts as defined in the selected one of said matrix tables, corresponds to a select message in said message table; and
a display for displaying said selected message.

24. The reconfigurable keyboard of claim 19 wherein said selecting means selects a different matrix table in response to activation of one of said switch contacts by said key means wherein the selection of another matrix table is a function defined in the one of said matrix tables defining the operation of said switch matrix.

25. The reconfigurable keyboard of claim 19 wherein said selecting means comprises a central processing unit.

26. A reconfigurable keyboard for interfacing with a host device, comprising:
a grid of a plurality of predefined key locations;
said grid comprising a plane with a matrix of switch slots, with a switch disposed in alignment with each of said slots below the plane thereof, each of said switches interfaced with said location means such that activation of any of said switches is sensed by said location means and the relative location thereof determined;
key means having a plurality of modifiable locations associated with said key locations such that when modified, selected said predefined key locations are accessible;
said key means comprising a plurality of key tabs each insertable into or removable from select ones of said slots interfacing with the associated one of said switches disposed in said switch slots, said key tabs allowing activation of select ones of said switches;
location means for determining the relative location of each of said key locations such that a selected one of said key locations can be distinguished from the remaining key locations;
means for storing a plurality of key tables, each of said key tables containing a unique set of information to define the function of each of said key locations;
means for selecting one of said key tables to define the function of each of said predefined key locations; and
output means for outputting command signals to the host device corresponding to the function of the selected one of said key locations as defined in the selected one of said key tables, said command signals being compatible with the host device.

27. The reconfigurable keyboard of claim 26 and further comprising an overlay for disposal over said matrix, said overlay having removable portions associated with each of said slots such that selected switches can be accessed with one of said key tabs and the remaining one of said switches removed from view, said key tabs insertable through an orifice defined by the removal of said removable portion.

28. A method for reconfiguring a keyboard for interface with the command language of a host device, comprising:
disposing a plurality of key switches at predefined locations on a grid, eacn of the key switches operable to provide a selectable key closure;
preventing the mechanical operation of desired ones of said key switches;
storing a plurality of key tables, each of the key tables containing a unique set of information to define the function of each key switch location;
selecting one of the key tables to define the function of the key switches on the grid which are mechanically operable;

preventing the carrying out of a function of a key switch as desired times even though mechanically operated;

determining the location of a key switch that is selected and operated by an operator; and outputting a command signal to the host device corresponding to the function of the selected key switch as defined by the selected one of the key tables, the command signal defined in the command language of the host device.

29. The method of claim 28 and further comprising:
inhibiting the output of the function corresponding to the function of the selected key switch; and
overriding the inhibited output in response to the selection of the sequence of key switch locations and the associated functions thereof after selection of the inhibited key switch locations.

30. The method of claim 29 and further comprising:
storing the functions of the sequence of key switch locations selected after selection of the inhibited key switch location;
counting the number of key switch locations selected in the sequence;
comparing the stored sequence with a predetermined pattern after a predetermined number of counts; and
overriding the inhibited output of the selected key switch location after the predetermined number of counts if a valid comparison is made.

31. The method of claim 28 and further comprising:
inhibiting access to select ones of the key tables while allowing access to others of said key tables;
storing a sequence of selected key switch locations in response to selection of an initiating key selection as defined by the function of the key switch location in the governing one of the key tables;
counting the number of key switch locations selected in the sequence;
comparing the stored sequence with a predetermined pattern after a predetermined number of counts; and
overriding the inhibited access when a valid comparison is made.

32. The method of claim 28 wherein the step of selecting comprises selecting a different key table in response to activation of a predetermined sequence of key swtiches and the resulting sequence of key functions.

33. The method of claim 28 and further comprising:
storing a message;
retrieving the message from storage in response to selection of one of the switches, the function associated with the switch, as defined in the key table, associated with the stored message; and
displaying the retrieved message.

34. The method of claim 28 and further comprising:
storing a plurality of messages in a message table;
associating select ones of the messages with key switch location information in said key tables such that the function of a key switch locations as defined in the select one of said key tables corresponds to a select message in the message table;
retrieving a select message from storage upon selection of the associated key switch location; and
displaying the retrieved massage.

35. The method of claim 28 wherein the step of selecting one of the key tables comprises selecting a different key table than the key table governing the function of the key switches in response to activation of one of the key switches.

* * * * *